US007131574B1

(12) United States Patent
Sciupac et al.

(10) Patent No.: US 7,131,574 B1
(45) Date of Patent: Nov. 7, 2006

(54) OPTICAL MEMORY CARD BASED E-COMMERCE BUSINESS METHOD

(75) Inventors: Louis H. Sciupac, Santa Clara, CA (US); Richard M. Haddock, Redwood City, CA (US)

(73) Assignee: Lasercard Corporation, Mountain View, CA (US)

( * ) Notice: Subject to any disclaimer, the term of this patent is extended or adjusted under 35 U.S.C. 154(b) by 1094 days.

(21) Appl. No.: 09/619,028

(22) Filed: Jul. 19, 2000

(51) Int. Cl.
*G06K 5/00* (2006.01)
*G06K 7/10* (2006.01)
*G06Q 40/00* (2006.01)

(52) U.S. Cl. ....................... 235/379; 235/380; 235/454

(58) Field of Classification Search ................ 235/380, 235/37, 382, 382.5, 383, 379, 454, 486, 375; 705/1, 14, 28, 26; 709/229
See application file for complete search history.

(56) References Cited

U.S. PATENT DOCUMENTS 4,491,725 A 1/1985 Pritchard .................... 235/375
5,089,693 A 2/1992 Haddock .................... 235/486
5,421,619 A 6/1995 Dyball ........................ 283/86
5,815,665 A * 9/1998 Teper et al. ................ 709/229
5,878,141 A * 3/1999 Daly et al. .................... 705/78
5,884,271 A * 3/1999 Pitroda .......................... 705/1
5,909,023 A * 6/1999 Ono et al. .................. 235/380
6,047,270 A 4/2000 Joao et al. ..................... 705/44
6,056,197 A 5/2000 Hara et al. .................. 235/454
6,101,477 A * 8/2000 Hohle et al. ................... 705/1

* cited by examiner

*Primary Examiner*—Thien M. Le
(74) *Attorney, Agent, or Firm*—Schneck & Schneck; Thomas Schneck

(57) ABSTRACT

In a system for reading data encoded on a single, secure, personal, portable database of private information, such as an optical memory card, a method of interaction between an optical card user, a broker and an agency seeking a transaction with the card user. The user is provided with a blank optical memory card which he encodes with the user's personal transactional information such as credit card numbers. The agency and user are provided with access to a transaction site. The user is able to use the single, secure medium to conduct many transactions. The user selects the encoded information that is needed to conduct the transaction with an agency. The information is read and transmitted to a broker who completes the transaction. Here, the agency is not provided with access to the information and the information is not stored in company or network database or on a network.

29 Claims, 3 Drawing Sheets

OPTICAL MEMORY CARD BASED E-COMMERCE BUSINESS METHOD

TECHNICAL FIELD

The present invention relates to storage mediums such as optical memory cards that store information in a manner that simplifies access to personal information and a method of on-line transmitting of select personal information from a single card for various transactions while keeping the personal information private.

BACKGROUND OF THE INVENTION

When transactions are conducted on-line or in person, specifically, business, personal, governmental or health transactions, customers must provide an agency with which the transaction is conducted with personal information. Such personal information may include address, telephone number, social security number, credit card numbers and bank account numbers. This information is highly valuable to other companies. Many times after a transaction is conducted the customer's personal information is sold to other companies without the customer's consent. In today's society, especially because most companies have access to the Internet and are able to easily transfer information to others, it is difficult for the customer to keep such personal information private. The more transactions the customer conducts, the more agencies have access to that customer's personal information and the more likely it is that the customer's personal information will be distributed to other companies on-line or otherwise.

Additionally, customers have many different cards with various types of personal information. For example, a customer may have a card with his or her bank account number, a card with his or her social security number and numerous credit cards with his or her credit card numbers. Numerous cards are necessary as one agency may only accept a certain type of card. At times, the number of cards one customer may have may be overwhelming and difficult to keep track of. Carrying such a large number of cards increases the risk of losing one or more cards. Without even realizing it, a customer may be putting the lost card in the hands of someone who may use it to the customer's disadvantage.

It is an object of the present invention to provide a user with a secure single medium such as an optical memory card (known in the art) that stores the user's personal information and that is used in conjunction with a method to conduct various transactions. It is a further object to provide a user with a method of conducting a transaction wherein the user is able to securely transmit personal information on-line to a broker who assists in conducting the transaction rather than providing an agency with direct access to that information. It is an additional object of the invention to allow a user the choice as to what type of transaction he or she wishes to conduct with the secure single medium wherein the choice is made using a transaction site such as, for example, the broker's web site, a kiosk including a reader/writer, a monitor and personal computer, or a Personal Digital Assistant (PDA). It is a further object of the invention that the user is able to transmit personal information directly to the agency if desired.

Additionally, it is an object of the present invention to provide the user with a choice as to which personal information to transmit and whether to transmit the personal information to an agency directly or to the broker. It is a further object of the invention that the agency is able to advertise its product and services at the transaction site. A transaction site may, for example, be a computer having a reader/writer or the kiosk and include the broker's e-commerce site. It is another object of the invention that a personalized web page appears when each agency and user accesses the broker's e-commerce site.

SUMMARY OF THE INVENTION

The above objects have been met by the use of an optical memory card or any secure data storage medium on which a user records personal information necessary for transactions, for example credit cards in a secure manner. The secure medium is used at a transaction site having a reader/writer and an Internet connection (or other on-line connection or network) in conjunction with a method of interaction between a medium user, the broker and an agency or company.

A user is provided with different card program enrollment methods. For example, a user may enroll in the program to receive the broker's services by accessing the broker's e-commerce site from his or her home. The user enters basic information such as name and shopping preferences. The user is provided with a password and an identification number. Later, the user is provided with a card. By visiting a transaction site such as a kiosk, the user is able to complete the enrollment process. A user records personal information on the card such as bank account information, credit card numbers, passwords and social security number and any other secure information that the user desires to have on the card acting as a secure personal portable database. This information is encoded onto the optical memory card but is not stored on any network or broker's, agency's or company's database. Additionally, the user records on the card his biometric indicia such as photograph, fingerprints and voice sample. This information, in addition to the identification number and password is used to verify the user's identification. Alternatively, the user is able to complete the entire enrollment process at a transaction site such as a kiosk. At the kiosk, the user is provided with a card. The user provides all necessary enrollment information and any desired personal information to be encoded on the card.

The agency, which may include, retailers, airports, government agencies, merchants, the healthcare industry, and others, enters into an agreement with the broker. The broker may provide the agency with a transaction site such as a kiosk. The agency has access to the broker's e-commerce site. The agency is able to advertise its goods and services on the broker's e-commerce site or kiosk. Additionally, the agency is provided with access to a customer's purchasing history and preferences and with brokering services available from the broker. In return the agency provides the broker with a payment.

A user, wishing to conduct a transaction, for example a business transaction, inserts the optical memory card into a card reader/writer at a transaction site. The agency may have a card reader/writer. Alternatively, the user has his or her own card reader/writer and conducts the transaction on-line. A transaction site may include a personal computer with card reader/writer and access to the broker's e-commerce site and/or a kiosk. With the transaction site the user is able to select the type of transaction and the type of information he wishes to have transmitted. The user decides whether the agency should be given access to that information. If the user decides that the agency should be given access, once the selected information is read it is transmitted directly to the agency without access by the broker. If the user decides not to give the agency access to the information, the selected information is transmitted to the broker who assists in conducting the transaction and will relay the information to a second agency if necessary. For example, if a purchase is to be made by the user, the user transmits his or her digitally signed authorization to the broker giving the broker authorization to broker the transaction using standard secure protocols. The user transmits securely on-line the select information such as a specific credit card number. The broker then transmits the credit card number and purchasing information to the second agency, such as a credit card company, to complete the transaction. The transmitted information is not stored by the broker or agency. A confirmation is then sent to the user and the first agency.

BEST MODE FOR CARRYING OUT THE INVENTION

Figure 1:
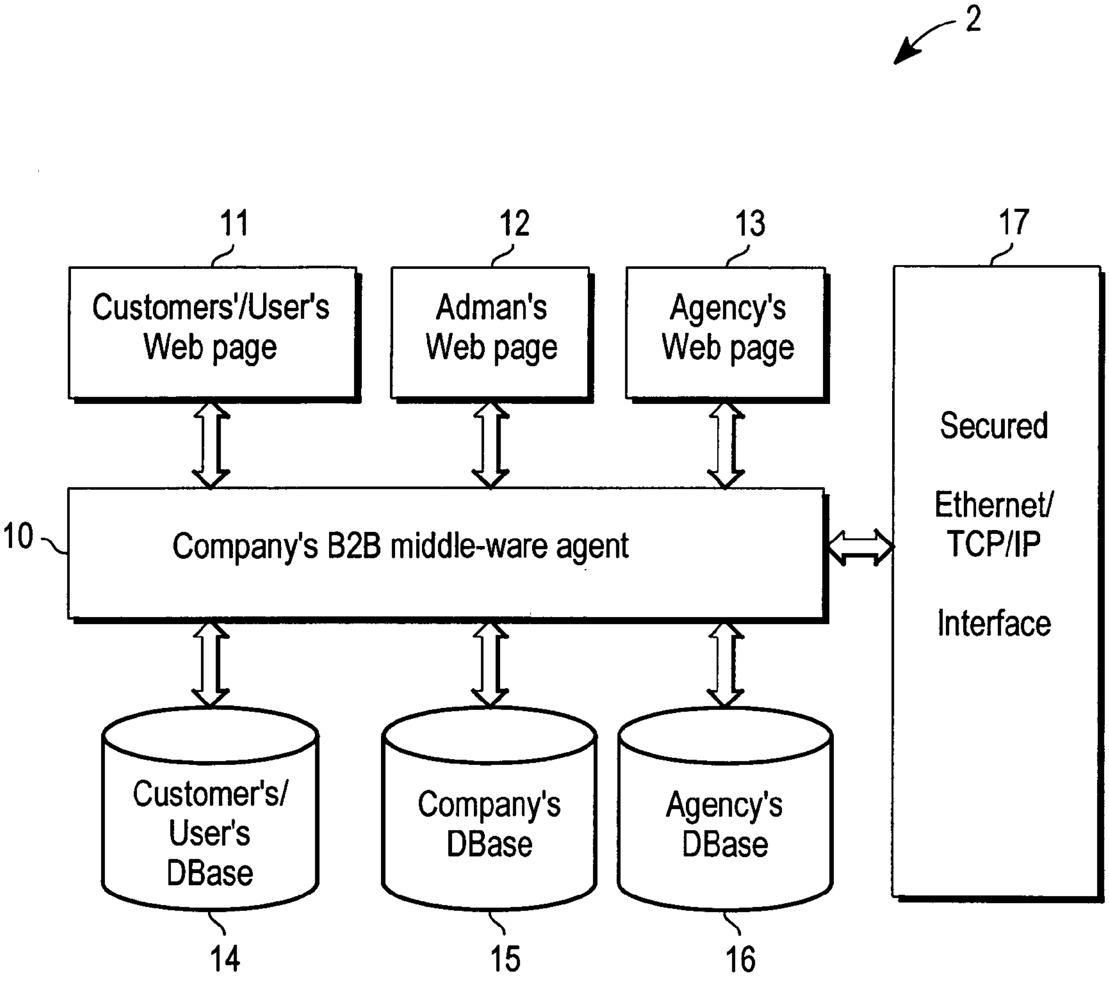
FIG. 1 is a block diagram of a company's e-commerce site in accordance with the present invention.

With reference to FIG. 1, a company's e-commerce site 2, is designed to allow the company to act as a middleman or broker between its customer and partner or agency for a user having a memory card with personal information recorded on the card. A business-to-business (B2B) middle-ware agent 10 has links to and can readily access, web pages 11, 12, and 13 and databases 14, 15, and 16 which comprise the company or broker's secure e-commerce site. The middleware agent 10 is a program that manages and distributes information between the broker, the different agencies and the customers/users. The e-commerce site 2 includes an on-line link to secured Ethernet/TCP/IP interface 17 or any other protocol.

When a customer or user enrolls in the company's card program, he or she provides the company (also referred to as the broker) with enrollment information. Enrollment information may include, name, an email address, shopping preferences, and different promotions the user would be interested in receiving but not personal sensitive data such as credit card or financial data. A customer may enroll by providing the company with enrollment information on-line. For instance, he or she may access at a transaction site, the company's e-commerce site and enter his or her enrollment information. This will create an entry in the user/customer's database 14 having the enrollment information. Alternatively, the user may provide enrollment information in person or via mail, facsimile, or otherwise. For example, the user may provide enrollment information at a transaction site such as a kiosk (shown in FIG. 2) or any computer having internet access and a reader/writer unit. At the transaction site, one or a combination of the following occurs. The user may enroll in the card program, conduct a transaction, view promotions, access his or her web site, change preferences and begin a transaction depending on the hardware available at the site.

After an entry is created in the customer database 14, the user will receive confirmation that his or her enrollment information has been received, a unique password and an identification number. The user may receive this information via email, mail, facsimile, at the transaction site, such as the kiosk, if used for enrollment or by other methods if preferred. Immediately, the user is able to receive benefits of the service such as having access to his or her own personal web page by entering the password and identification number. The web page may include the promotions from agency's preferred by the user's.

Later, preferably within a time span of no more than a few days, the broker provides the user with an optical memory card or other secure storage medium that has the capability of securely storing various amounts of personal information. Details on construction of an optical memory card can be found in U.S. Pat. No. 5,421,619 to Dyball, which is hereby incorporated by reference. Other examples of secure storage media include laptops, PDAs and smart cards. The card is sent via mail or may be picked up personally by the user. If the enrollment information is provided at the kiosk, the user will be provided with a card immediately and may activate the card immediately.

Figure 2:
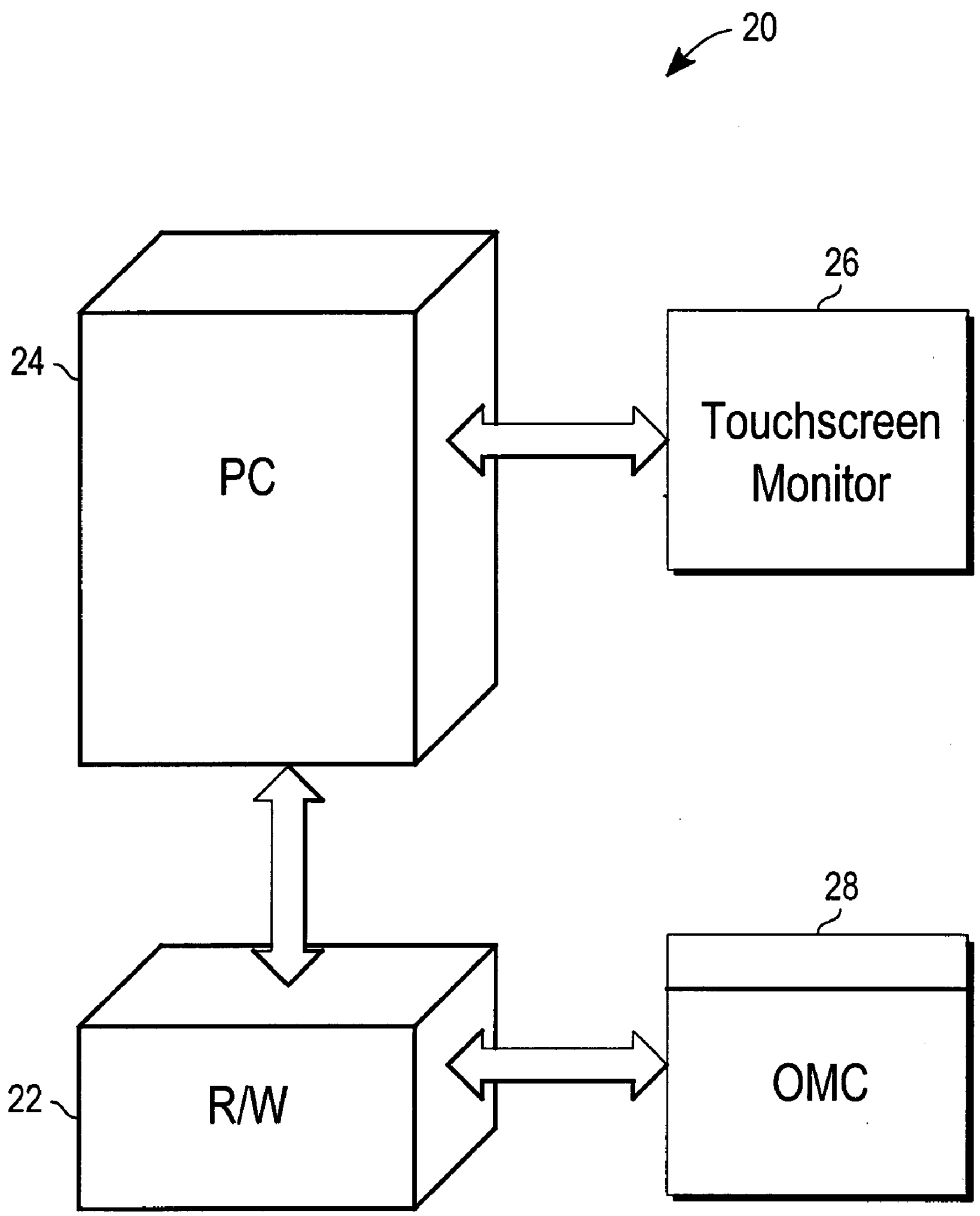
FIG. 2 is a block diagram showing a kiosk having a touch screen monitor, personal computer, reader/writer and optical memory card to be used with the e-commerce site of FIG. 1.

In order to activate the card, the user visits a transaction site such as, for example, a kiosk 20 seen in FIG. 2. The kiosk 20 comprises a reader/writer 22, a personal computer 24 and a touch screen monitor 26. A description of a reader/writer unit 22 is shown in U.S. Pat. No. 5,421,619 to Dyball, as well as U.S. Pat. No. 5,089,693 to Haddock, which are hereby incorporated by reference. Other examples of reader/writer units include wireless, infrared and direct contact units. The type of reader/writer used corresponds to the secure storage medium that is used. Additionally, the kiosk 20 may also include a camera, a fingerprint access unit and a voice confirmation unit (not pictured) or any other biometric device. After inserting an optical memory card 28, and after entering his or her user identification number and password the user is able to complete the enrollment process.

During the enrollment process the user's picture will be taken and his or her voice sample and fingerprints captured at the transaction site such as a kiosk. This information is encoded and stored on the optical memory card. The user provides his or her personal information including social security number, credit card numbers, bank account numbers, reward program numbers, carrier identification, birthday and anniversary dates, passport information, passwords information, health information, and any other sensitive information that a user would like to have ready for use but not to be stored on a network or a company's, agency's or broker's database. The user may provide any sort of information that the user desires to be encoded on the optical memory card which acts as a secure, personal, portable database of private information. After providing the information, the card reader/writer 22 encodes the information onto the single secure medium. The single medium is preferably an optical memory card 28 because these have a large storage capacity and are most secure, but could be a magnetically encoded card or any medium such as a laptop, PDA or smart card, that allows desired amounts of information to be encoded securely onto and read from the medium. This provides a portable database of private information unifying the various types of information.

During the enrollment process the user may save all personal information to be encoded on the optical memory card 28 to a disk or a secure medium that has sufficient storage capacity such as a PDA. The disk can be used to simplify the process of providing personal information at a kiosk 20. Alternatively, the information may be stored on a computer. For example, the information may be stored on what is commonly known as a computer cookie. If the computer is on-line the user is able to download the information to the kiosk 20 during enrollment but biometric information still must be provided at the kiosk. At this point, the user is ready to use the optical memory card 28 to conduct various transactions.

Figure 3:
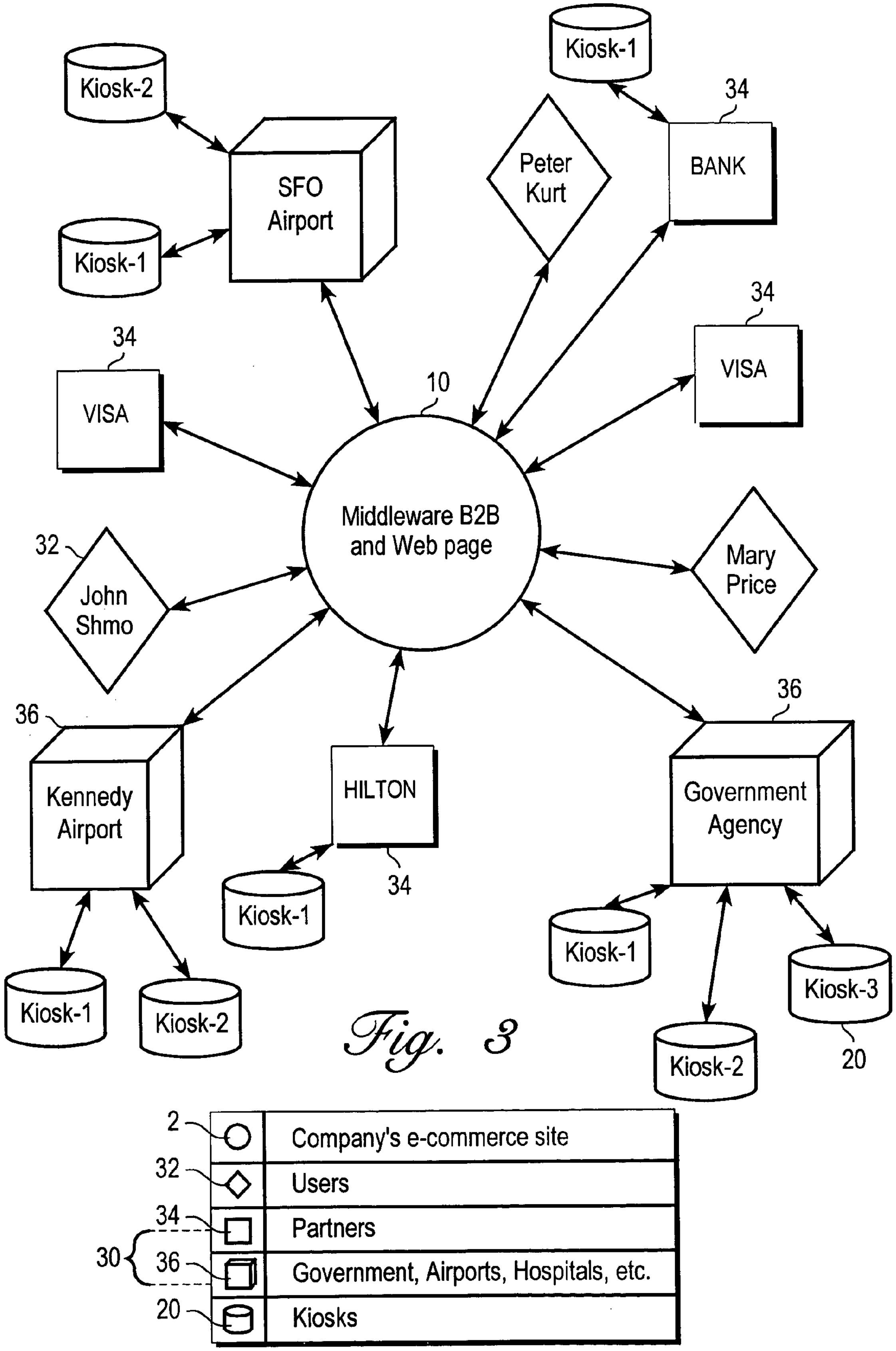
FIG. 3 is a block diagram of the connection between the company's e-commerce site, users, agencies and kiosks in accordance with the present invention.

As seen in FIG. 3, the broker, working through the use of middle-ware agent 10 which is a part of the broker's e-commerce site 2, enters into agreements with various agencies 30. Agencies include partners 34 or government agencies (such as the Department of Immigration and the State Department), airports, hospitals, and healthcare clinics 36. Partners 34 include, for example banks, merchants, hotels, rental car companies such as HERTZ or credit card companies such as VISA. Agencies 30 can be any entity with which the broker desires to enter into an agreement. Brokers provide agencies 30 with various services. These services include providing the agency with a transaction site that may include a card reader/writer unit 22 (FIG. 2), providing the agency with on-line access to the broker's e-commerce site 2 (FIGS. 1 and 2), providing the agency 30 with access to a select portion of the user's database 14 (FIG. 1) which contains the user's shopping preferences and history, and providing the agency with its own database 16 connected to the broker's e-commerce site 2. With access to this database, the agency is able to promote its goods and/or services. The promotions may appear at a transaction site such as a kiosk, or within the broker's e-commerce site accessed by the user.

Additionally, the services include the broker agreeing to broker transactions between a user 32 and an agency 30. The card 28 provides the users 32 with a convenient method for conducting transactions. Therefore, users are more likely to frequent agencies 30 that accept the card. By entering into an agreement with the broker, the agency 30 may be rewarded with more business or customer satisfaction. In return the agency provides the broker with compensation such as a payment of money. The agreement between the agency and the broker may differ from agency to agency. For example, one agency may wish to enter into an agreement wherein the broker provides brokering services and promotional services for an agency. A second agency may wish to only use the promotional services which the agency provides and have the user transmit personal information directly to the agency rather than use the brokering services.

Referring back to FIG. 1 it is seen that the company's B2B middle-ware agent 10 acts to manage data between the customer's/user's database 14, the company's database 15 and the agency's database 16. Select information from each of the databases appears within a web page. For instance information regarding a customer's shopping preferences found within a customer's database 14 may be transmitted using the company's B2B middle ware-agent 10 to the agency's web page 13. However, data base information such as the user's identification number and password would in the vast majority of instances not be transferred. Information from the agency's database 16 regarding description of goods and services, promotions, discounts, prizes and reminders may be transmitted to the customer's web page 11. The company's database 15 may contain information regarding the number of users that have cards, the amount of money owing and paid from said agencies and any other administrative or desired information. Additionally, the Adman's web page 12 displays information such as administrative information for the company. Through the Adman's web page 12, the company's database 15, and the B2B middle-ware agent 10, the broker is able to manage all databases.

Additionally, the broker is able to monitor the distant transaction sites such as kiosks 20 (FIG. 2), the status of the network and the databases and keep maintenance and performance of the system running at its optimum level without incurring costs of traveling and unnecessary kiosk site checkups. When each user, agency or administrator accesses the company's transaction site, the web page corresponding to the user, the agency or administrator can be accessed.

The following is a description of how a customer/user may use an encoded optical memory card 28 to conduct various transactions. The user is provided with access to the company's e-commerce site 2 when accessing the card program from a computer. Alternatively, at an agency, a transaction site, for example a kiosk, is provided. That agency and other agency's promotions may appear on the kiosk or computer screen. After entering a password and an identification number at a kiosk or on a network computer, a personalized user web page 11 appears. It contains information such as promotions that were requested by the user. More transaction options and information regarding the agency will be provided to the user upon insertion of the card and verification of identity.

Next, a user inserts an encoded optical memory card into a card reader/writer 22 of the type shown in FIG. 2 at a transaction site. The reader/writer may be at the user's home therefore, enabling a user to conduct a complete on-line transaction from home through an e-commerce site. Alternatively, the reader/writer may be present at a kiosk at an agency location.

Before the encoded card 28 is read, the user's identification must be verified. Verification of the user may occur through one of or a combination of the following. The user may provide a password and/or identification number using secure network protocols. The user may also be or alternatively be biometrically identified using a photograph of the user, a voice sample and fingerprints using secure network protocols. Only upon verification that the person inserting the card into the reader/writer is the actual owner of the card, will the card reader/writer read the optically encoded data from the card. Upon undergoing verification the user is able to complete a transaction.

With the touch screen monitor 26 and personal computer 24 the user is able to select which type of transaction he or she wishes to conduct. For example, if the user wishes to rent a car he or she may select business transaction. If the user wishes to provide the government with information such as a social security number, he may select governmental transaction. If the user wishes to sign up for a rewards program he or she may select a personal transaction. After selecting the type of transaction, for example renting a car, various promotions specifically from rental car companies may appear. The user's preferences may be accessed from the user's card 28, the database 14, or inputted by the user. In this example, the user chooses to rent a car from a specific company.

The user is able to select which information encoded on the optical memory card he or she would like to use from the options present on his card. For example, the user is able to choose which credit card he would like to use, the preferences he desires for the car, or insurance options. After selecting the desired information, the user transmits the necessary information to conduct the transaction to the broker on-line or to the agency depending on setup and preferences, using secured methods known in the art. In one embodiment, the user may select parts of information (i.e. parts of credit card numbers) and transmit this information in parts, rather than as a whole. This can be used as an added safety mechanism so that information is not intercepted.

The broker then uses the information to complete the business transaction of renting of the car. Before the broker is able to handle the transaction, the broker must be given the user's authorization to conduct such a transaction. This authorization could be transmitted on-line to the broker through the use of a digital signature. In this way, the user signs the order to the broker. The broker will then broker the transaction.

In this example the broker notifies the selected credit card company of the transaction. The broker enters into an agreement with the credit card company or other agency 30 involved in the transaction. The agreement allows the broker to broker the transaction. Once the transaction has been processed, i.e. credit card approval is complete, the broker will send a confirmation to the user and to the rental car company indicating that the transaction has been conducted and approved. The user's confirmation and/or transaction history is saved in the optical memory card for future audit trails and for use as a receipt of a transaction. The agency is not given access to the information encoded on the user's card unless it is required by the agency to complete the transaction, unless the user decides to give the information directly to the agency, or unless the information is related to user preferences. Therefore, the agency will not be able to sell the user's personal information as is often the case today.

In one embodiment, the user may be given a choice as to whether he or she wishes to directly transmit information to the agency 30. For example, the user may desire to transmit his or her social security number to a governmental agency 36. The governmental agency is in need of the number and the broker is not needed to broker the transaction. Though the broker is not providing brokering services in this instance, the broker provides the user with a single card/medium for recording that unifies all selected personal information that different agencies need. The user 32, once he has recorded his personal information, can use that same card to conduct numerous transactions from an enrollment/transaction station, such as kiosk 20 or computer. It is not necessary for the user to carry multiple cards in order to conduct various transactions as the card unifies all desired information.

In another embodiment, the user is not given a choice with regard to a specific agency and must directly transmit required information from the card to the agency if the user desires to conduct the transaction with the agency. A benefit of the present invention is that the user is able to use his single encoded card to conduct more than one type of transaction as the user is able to select the type of information that he desires to transfer.

In an alternative embodiment, the user may simply use his or her password and identification number using secure network protocols to access his or her personalized web page 11 from a transaction site or from just a computer. The user is able to change any shopping preferences he or she has listed if desired. These changes are reflected in the user data base 14. If such changes are made where a card/reader writer 22 is not present, the card itself will not be updated. However, the card 28 can be updated, the next time a user visits a transaction site if a user selects an update card option. The updated information is encoded on the card.

Additionally, the user may select a specific agency from which he or she wishes to view information or to begin a transaction process. For example, by simply entering a password and an identification number, the user is able to reserve a rental car. In this example, the rental car agency is provided with the information, such as name or address, needed to reserve the car. Such information may be obtained from the user's database 14. When it comes time for the user to pick up the rental car, it is not necessary for the user to complete any paperwork as the necessary information has been provided through the use of the password and identification number in conjunction with the transaction site and user selection. The user need only provide a method of payment which can be conducted by the methods mentioned above at a transaction site.

For example, if a purchase is to be made by the user, the user transmits his or her digitally signed authorization to the broker giving the broker authorization to broker the transaction using standard secure protocols. The user transmits securely on-line the select information such as a specific credit card number. The broker then transmits the credit card number and purchasing information to the second agency, such as a credit card company, to complete the transaction. The transmitted information is not stored by the broker or agency. A confirmation is then sent to the user and the first agency.

After the transmitted, selected information is used to conduct a transaction, the transmitted selected information is destroyed or not stored. Thus, personal information is encoded onto the optical memory card but is not stored on any network or brokers's, agency's or company's database.

The invention claimed is:

1. In a system of reading data encoded on a storage medium, a method of business interaction between a broker and an agency comprising:

providing a user with a secure storage medium;

recording personal transaction information and on the medium;

verifying the user identification;

reading selected portions of the information;

transmitting selected information to said broker; and the broker using said selected information to conduct a transaction between said agency and said user without revealing said selected, transmitted information to said agency.

2. The method of claim 1 wherein said storage medium is an optical memory card.

3. The method of claim 1 further comprises providing a reader/writer and reading selected portions of user information with said reader/writer.

4. The method of claim 3 further comprising inserting said medium into said reader/writer before reading selected portions of user information.

5. The method of claim 1 further defined by conducting more than one transaction with more than one agency using said storage medium.

6. The method of claim 1 further comprising said agency entering into an agreement with said broker wherein said agency agrees to pay to said broker a fee and said broker agrees to broker said transaction between said user and said agency.

7. The method of claim 1 further comprising said agency entering into an agreement with said broker wherein said agency agrees to pay to said broker a fee and said broker agrees to provide said agency with a reader/writer.

8. The method of claim 1 further comprising said broker providing confirmation to said user and said agency indicating that said transaction has been conducted.

9. The method of claim 1 further comprising said broker providing on-line access through a broker's e-commerce site.

10. The method of claim 9 wherein providing on-line access to said broker's e-commerce site is further defined by allowing said agency to set up promotions on said site and to check customers preferences and purchasing history on-line.

11. The method of claim 9 wherein providing on-line access to said broker's e-commerce site is further defined by allowing said user to view said agency's promotions on-line.

12. The method of claim 9 further defined by said broker's e-commerce site providing an administrative database and web page, an agency's database and web page, a user's database and web page and a middle-ware agent.

13. The method of claim 12 wherein said user's database includes said user's password, history of transactions and purchasing preferences.

14. The method of claim 1 wherein said data is personal data.

15. The method of claim 1 wherein said data that is read is selected by the user.

16. The method claim 1 wherein transmitting selected information comprises transmitting portions of selected information.

17. The method of claim 1 wherein said data that is transmitted is selected by the user.

18. The method of claim 1 further defined by:

the user providing said broker with enrollment information; and the broker providing said user with a password for said medium.

19. The method of claim 18 wherein providing said broker with enrollment information is further defined by downloading said information from a computer to a kiosk.

20. The method of claim 1 wherein said data encoded on said storage medium includes at least two types of personal information.

21. The method of claim 1 further comprising recording biometric data on said medium and comparing said recorded biometric data with biometric data of said user to verify said user identification.

22. The method of claim 21 wherein said biometric data comprises a picture of said user.

23. The method of claim 1 further defined by transmitting the data on-line to said broker, said user providing said broker with a digitally signed authorization giving the broker the authority to broker the transaction.

24. The method of claim 23 further defined by storing said digitally signed authorization on said broker's database.

25. The method of claim 23 wherein brokering the transaction includes said broker relaying said user's credit card number to a second agency.

26. The method of claim 1 further defined by storing on the storage medium any transactions conducted by said user.

27. The method of claim 1 further comprising after said transmitted information is used, destroying said transmitted information.

28. The method of claim 1 wherein after using said transmitted, selected information to conduct said transaction, further comprising destroying said transmitted, selected information.

29. The method of claim 1 wherein after transmitting selected information to said broker, failing to store said transmitted, selected information at a database of said broker.

* * * * *